United States Patent [19]

Craig et al.

[11] 4,199,927
[45] Apr. 29, 1980

[54] COMBINE REEL WEED SHIELD

[76] Inventors: R. Colin Craig, 511 Walnut Hills; John R. Craig, 505 Windy Ct., both of Kokomo, Ind. 46901

[21] Appl. No.: 895,546

[22] Filed: Apr. 12, 1978

[51] Int. Cl.[2] .......................................... A01D 75/18
[52] U.S. Cl. ........................................ 56/314; 56/1
[58] Field of Search ............................ 56/314–320, 56/320.1, 1

[56] References Cited

U.S. PATENT DOCUMENTS

| | | | |
|---|---|---|---|
| 1,007,878 | 11/1911 | Krell | 280/160 |
| 1,132,147 | 3/1915 | Arbeiter | 280/160 |
| 1,983,086 | 1/1935 | Parker | 280/160 |
| 2,305,254 | 12/1942 | Hirschkorn | 280/160 |
| 2,312,785 | 3/1943 | Welty | 56/314 |
| 2,448,078 | 8/1948 | Brown | 56/314 |
| 2,632,991 | 3/1953 | Schwartz | 56/314 |
| 2,679,719 | 6/1954 | Hill | 56/314 |
| 3,672,134 | 6/1972 | McCallum | 56/14.4 |
| 3,967,439 | 7/1976 | Mott | 56/314 |

Primary Examiner—Jay N. Eskovitz
Attorney, Agent, or Firm—Woodard, Weikart, Emhardt & Naughton

[57] ABSTRACT

A combine reel weed shield includes a substantially flat panel member and a vertically oriented deflector plate attached along one longitudinal edge to the inwardly facing surface of the panel member. The weed shield includes means for attaching to a reel support arm of a combine and the weed shield is designed so as to cover a majority of the end of the reel and extend forward of the reel when the shield is attached to the support arm. The deflector plate is generally rectangular and its vertical length is substantially equal to the height of the panel member at the location of attachment of the plate to the panel member. The deflector plate is located forward of the forwardmost portion of the reel and the deflector plate is formed with a 135 degree bend such that it pivots away from the panel member at a 45 degree included angle. The deflector plate shields the corresponding hub portion of the reel on the end of the reel adjacent to where the weed shield is attached to the support arm.

22 Claims, 8 Drawing Figures

COMBINE REEL WEED SHIELD

BACKGROUND OF THE INVENTION

This invention relates in general to weed guards and in particular to weed shields for use on farm machinery.

Most individuals who are familiar with farming and farm machinery are aware of the problem of weeds, stalks, vines and other plant portions becoming entangled around rotating farm machinery components such as vehicle axles as the machinery is used for such activities as harvesting. Typically, the region between the main body of the vehicle and an outlying wheel or other rotating component, where a portion of an axle or shaft is exposed, is most susceptible to this entanglement. In time and with continued use of the machinery, the buildup of such weeds and plants may become so severe that it adversely affects performance of the machinery if not completely stalling the rotating component. When stalling occurs, or when performance is influenced to an unacceptable degree, the machinery must be stopped and the entangling weeds and plants manually removed either by pulling the weeds loose or cutting the entangled mass.

In order to attempt to alleviate this problem as well as related problems associated with wheels and rotating components, the following listed patents disclose various ideas which have been conceived.

| Patent No. | Patentee | Issue Date |
|---|---|---|
| 1,007,878 | Krell | 11/07/11 |
| 1,132,147 | Arbeiter | 3/16/15 |
| 1,988,086 | Parker | 1/15/35 |
| 3,672,134 | McCallum | 6/27/72 |
| 2,305,254 | Hirschkorn | 12/15/42 |

Krell discloses a guard for automobile wheels wherein a guard plate is adapted to automatically protect a wheel and particularly the tire portion, from stones or other obstructions for preventing the tire from being punctured. Although the guard plate acts as a shield, it is not designed nor intended to shield weeds or other plants from wrapping around the axle of the automobile.

Arbeiter discloses a guard for the wheels of sulky or gang plows which can be easily and quickly applied to the rear wheel in order to protect the rear wheel from dirt, weeds, and the like which may gather and retard the operation of the wheel. The disclosed guard provides only marginal shielding in that the angular plate does not extend completely over the end of the wheel and the guard is not positioned close to the ground. Consequently, the gaps left around the wheel will permit weeds and other plants to become entangled around the shaft.

Parker discloses a wheel guard for use with wheel cultivators and other agricultural machinery to prevent entanglements of growing plants and other vegetation in the spokes of the wheel. The guard consists of a U-shaped member which is supported by a transverse bar which extends from one side of the vehicle to the opposite side. The requirement of the transverse bar as well as the small size of the guard itself means that the disclosed design would not be suitable for the reel of a platform combine. The guard does not adequately cover the end of the wheel to prevent tall weeds, growing on an incline or bent to one side, from protruding into the spokes of the wheel as the machinery passes. Furthermore, the mechanical complexity of the device does not provide a simple, inexpensive, easy to install or removable device.

McCallum discloses a crop harvestor for cutting a standing crop and depositing the cut crop into a swath on the ground. The device includes a pair of crop guide shields which are disposed over the two gauge wheels which provide rolling ground suport for the platform. The shields also serve a dual function of directing the cut crop into a central region where it will be deposited on the ground. Of note is the fact that the shields do not, nor are they intended to, shield the rotatably reel from weeds and plants which might become entangled around the axle or hub.

Hirschkorn discloses a bean cutting apparatus wherein the apparatus may be shifted to and from operating or bean cutting positions by a connection with power arms. The apparatus includes deflecting plates and a plurality of deflecting rods which are oriented in a diverging manner in front of and on opposite sides of each front wheel of the tractor with which the apparatus is used. The deflecting plates and rods do not extend over the end of the front wheels and the open design of the rods could permit weeds and other plants to become entangled. The apparatus is not designed for use with the reel of a combine and would not be acceptable for such use.

There are also commercially available reel shields such as those offered by the John Deere Company. Two designs of weed shields offered by the John Deere Company appear on page 5 of the current John Deere catalog entitled "Grain and Maize Combines/Grain Windrowers." One design includes merely a metal bar formed in a generally rectangular shape and located forward of the reel, but to the side. Such a unit does not shield the weeds and plants which are in line with the reel hub and the open design of this shield is not effective to prevent weeds and plants from protruding into the hub portion. Another arrangement offered by John Deere is referred to as a "divider" and its purpose is to pick up and separate crops which are matted down or tangled. These dividers are not designed to cover the end of the reel and are not effective in preventing tall weeds and plants, and especially those bent or growing to one side, from wrapping around the reel hub.

Harvesting of such crops as soybeans with a reel and combine arrangement pose certain problems with respect to weed entanglement. While it is important to maximize the usable width of the reel and not to cut the soybeans, or similar crop, until the reel fingers draw the soybeans into the cutting blade, the fibrous nature of the plant stalk and stems and their height at harvesting result in a high likelihood of entanglement. Due to the height of the plants as well as the height of the various weeds which may be present in soybean fields, to be effective, a weed shield must be of sufficient height, to prevent weeds and plants from protruding into the corresponding hub portion at the end of the reel adjacent to where the shield is mounted. Furthermore, it would be an improvement to these various weed shield designs if such weed shields could be quickly and inexpensively added to existing equipment so that conversion would be available for virtually any conventional reel and combine without the necessity for major overhaul or extensive modifications.

SUMMARY OF THE INVENTION

A weed shield according to one embodiment of the present invention comprises a substantially flat, upright panel member and means for attaching the panel member to a combine, adjacent one end of the combine reel. The panel member has a reel-facing surface and extends vertically and horizontally so as to cover a majority of the end of a combine reel and extend forward of the reel.

One object of the present invention is to provide an improved weed shield for the reel hub portion of a platform-style combine head.

Related objects and advantages of the present invention will be apparent from the following description.

DESCRIPTION OF THE PREFERRED EMBODIMENT

Figure 1:
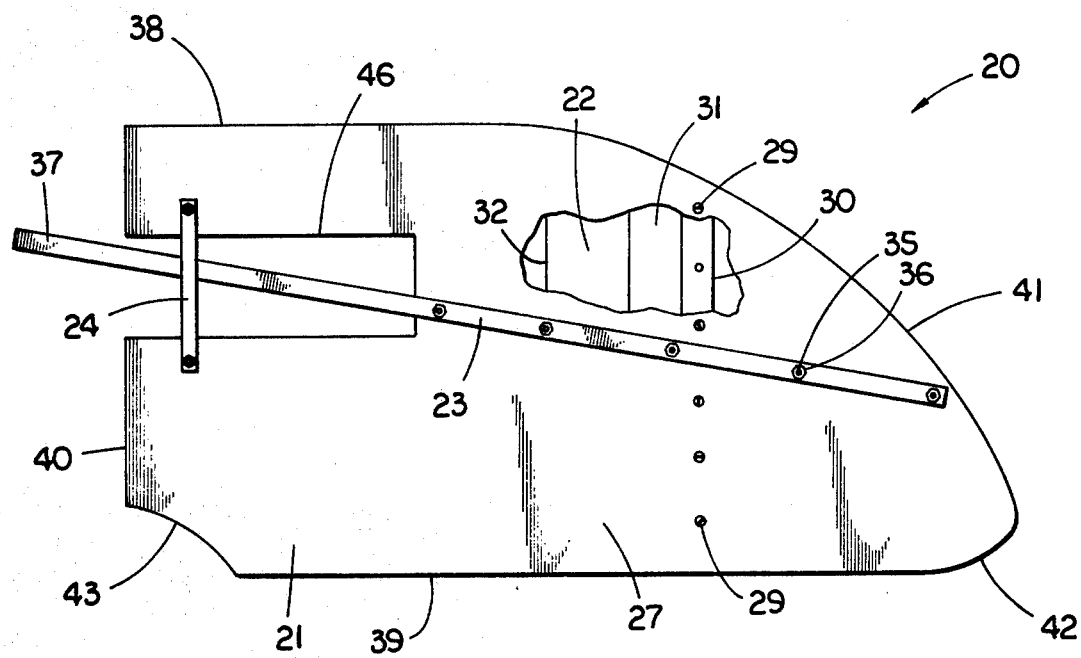
FIG. 1 is a side elevational view of a weed shield according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
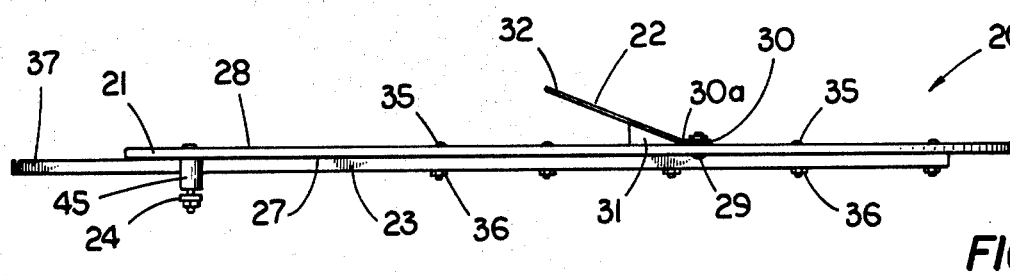
FIG. 2 is a top view of the FIG. 1 weed shield.

Referring to FIGS. 1 and 2, there is illustrated a combine weed shield 20 which is designed to fit between a combine reel support arm and a combine reel and effectively shield the hub portion of the reel and prevent it from becoming entangled with weeds and plants. Shield 20 includes a substantially flat, upright panel 21, a deflector plate 22 rigidly attached to panel 21, a support bar 23 and a clamping brace 24. Panel 21 has an outwardly facing surface 27 and an inwardly facing surface 28 to which plate 22 is attached by fasteners 29. Plate 22 may be, for example, a metal member which has been formed along one longitudinal side portion 30 with a 135 degree bend so with edge 30 attached to surface 28, the remainder of plate 22 pivots away from surface 28 at an approximate 45 degree included angle. In order to prevent plate 22 from bending too far inwardly when weeds and plants are encountered by plate 22 as will be described hereinafter, a wedge 31 is positioned snugly between plate 22 and surface 28 and is attached to both members by suitable fastening means. In lieu of using wedge 31 to reduce the deflection of plate 22, a support brace could be secured between outer edge 32 of plate 22 and surface 28 or some similar mechanical arrangement could be employed. Plate 22 is generally rectangular in shape, in flat form, prior to the forming of bend 30a, and when attached to panel 21, plate 22 extends in a vertical direction for substantially the entire height of panel 21 at the location where plate 22 and panel 21 are attached to each other. It is also possible to weld plate 22 to surface 28, thereby forming a single integral member. However, different harvesting demands may necessitate different sized or styled deflector plates 22 and by providing a series of clearance holes in panel 21 at an optimum forward mounting location for plate 22, different deflector plates can be interchanged by the use of conventional threaded fasteners 29.

Support bar 23 is a single piece of channel iron which is securely attached against surface 27 by means of five bolts 35 and five corresponding nuts 36. Bar 23 extends beyond the rearward end of panel 21 and a majority of that portion of bar 23 between end 37 and the first bolt from end 37 is positioned within a corresponding reel support arm of a combine with which shield 20 is used as will be described hereinafter. Bar 23 may also be formed in some shape other than straight or of a different size or length in order to attach to or be positioned within the reel support arm of different combines.

Panel 21 includes a horizontal top edge portion 38, a horizontal bottom edge portion 39 extending forward of the top edge portion, a notched rear edge portion 40, a top convex arcuate portion 41, a bottom convex arcuate portion 42 and a concave arcuate portion 43. The adjacent ends of these various portions are joined together in such a way as to define the periphery of panel 21 as is illustrated in FIG. 1. Notch 46 as part of rear edge portion 40 provides suitable clearance access through panel 21 for the attachment of the reel support arm 47b (see FIG. 5) of combine 48 to one end of axle 49 of reel 50. As illustrated in FIG. 6, two panels 21 and 66 would typically be used with a combine reel, with one panel at each end of the reel. In order to maintain some rigidity for panel 21 in the area of notch 46 and to provide moderate clamping action against support arm 47b when shield 20 is mounted onto combine 48, brace 24 spans notch 46 and is attached at its outer ends to surface 27. Brace 24 is spaced from surface 27 by two spacers 45 which serve to provide the necessary clearance between brace 24 and surface 27 for the passage therebetween of support arm 47b, and the degree of clamping against arm 47b is controlled by the length of the spacers 45. Reel 50 is a conventional-style platform combine reel which includes two sets of dual end support plates 51, 51a and 52, 52a and two intermediate single support plates 53 and 54. Pivotally attached between corresponding spokes 55 are finger bars 56. Reel 50 is located in front of the combine and acts to rake and pull the crop, such as soybeans, into the combine cutter bar 57.

Figure 3:
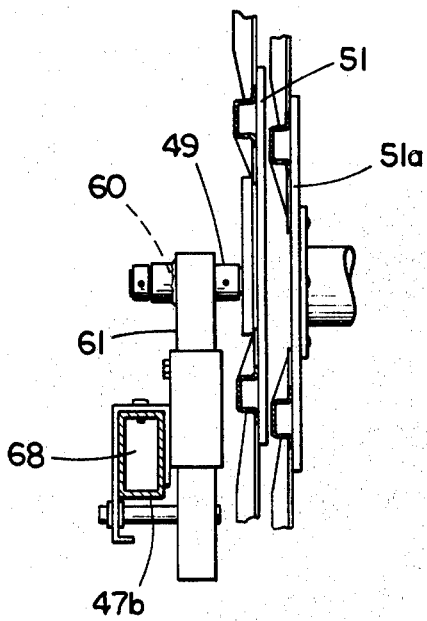
FIG. 3 is a fragmentary front view of a support bracket for coupling a reel axle to a combine supporting arm.
Figure 4:
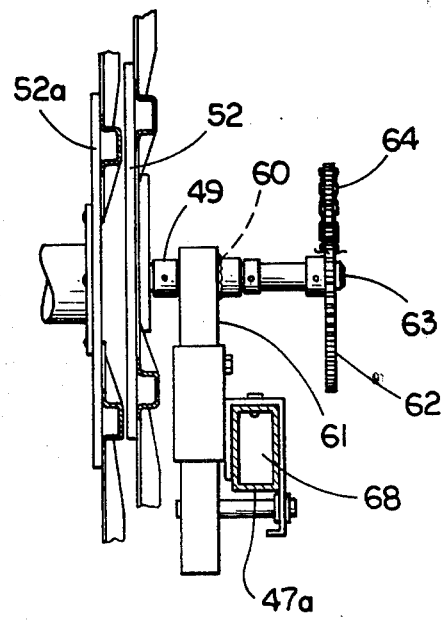
FIG. 4 is a fragmentary front view of a support bracket and a sprocket and chain arrangement for providing rotary motion to the reel axle from the combine power drive.

Referring to FIG. 3, axle 49 extends through end support plates 51 and 51a and is bearingly supported by means of ball bearing 60 which is within bracket assembly 61. Bracket assembly 61 is clamped into position around support arm 47b. It is the hub portion of the reel, that area between bracket assembly 61 and plate 51 which is primarily susceptible to becoming entangled with weeds and other plants as the combine and reel work their way across the field while harvesting soybeans or a similar crop. The opposite end of reel 50 (see FIG. 4) is arranged with respect to end support plates 52 and 52a and support arm 47a in much the same manner as described for the opposite side of the reel. Similarly, weeds and other plants have a tendency to become entangled between bracket assembly 61 and plate 52. Further, there is also the possibility of weeds and other plants becoming entangled between the two end support plates at each end of reel 50. The difference between the two ends of reel 50 is that at one end reel 50 is driven by means of a sprocket 62 which is attached to end 63 of axle 49 and which is coupled to the drive power from combine 48 by means of roller chain 64. This sprocket and chain drive arrangement on end 63 also presents another possible problem area for weed and plant entanglement and consequently, a second deflector plate 65 is attached to the outwardly facing surface of panel 66 in order to shield the chain and sprocket arrangement (see FIG. 6). Plate 65 is a metal member formed with a 135 degree bend and extends outwardly and rearwardly from panel 66. Panel 66 is virtually identical to panel 21 except for those obvious differences required between left side and right side parts, and consequently, weed shield 67 is virtually identical to weed shield 20 except for the presence of deflector plate 65.

Figure 8:
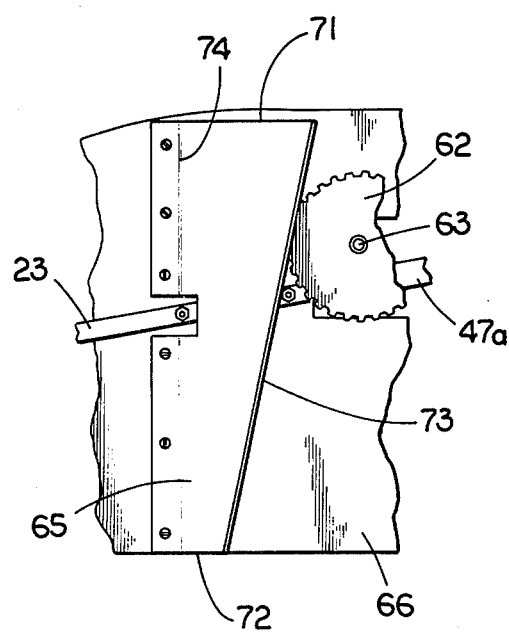
FIG. 8 is a partial side elevational view of another weed shield according to a typical embodiment of the present invention, taken along line 8—8 in FIG. 6.

Deflector plate 65 (see FIG. 8), although similar in many respects to plates 22, differs in two primary ways. First, plate 65 is tapered inwardly from top edge 71 to bottom edge 72 along rear edge 73 and secondly, plate 65 is notched so as to provide clearance for bar 23 which must extend from one side of plate 65 to the other side. Various geometries are possible for plate 65 so long as the angle of bend 74 and the overall plate size are sufficient to shield the sprocket and chain arrangement.

Figure 5:
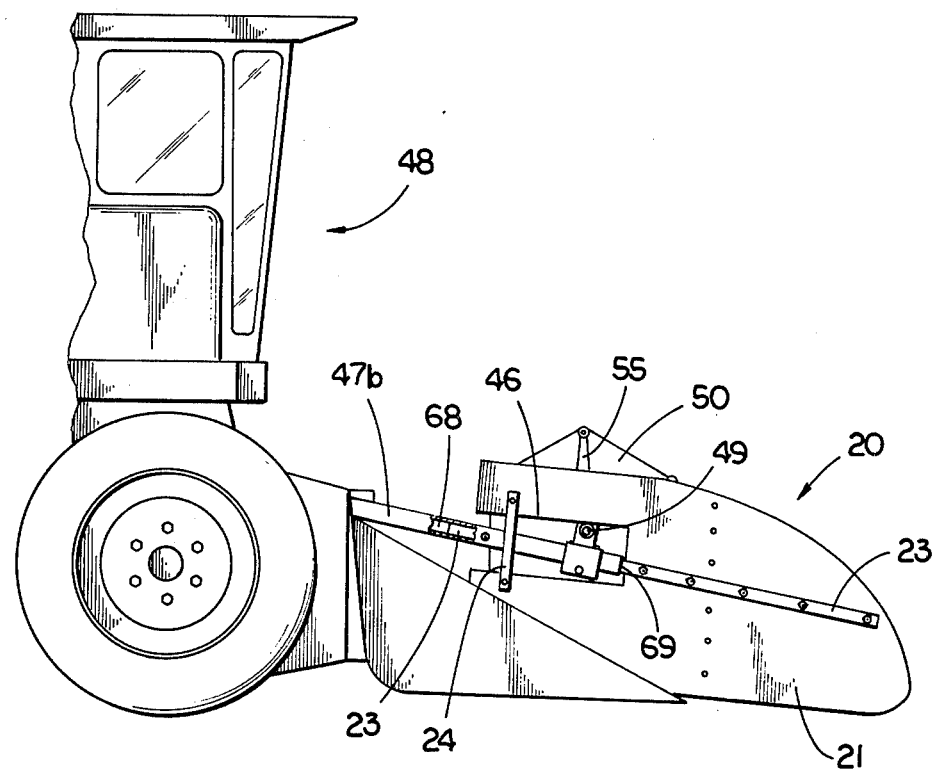
FIG. 5 is a fragmentary side elevational view of the FIG. 1 weed shield as attached to a combine.
Figure 6:
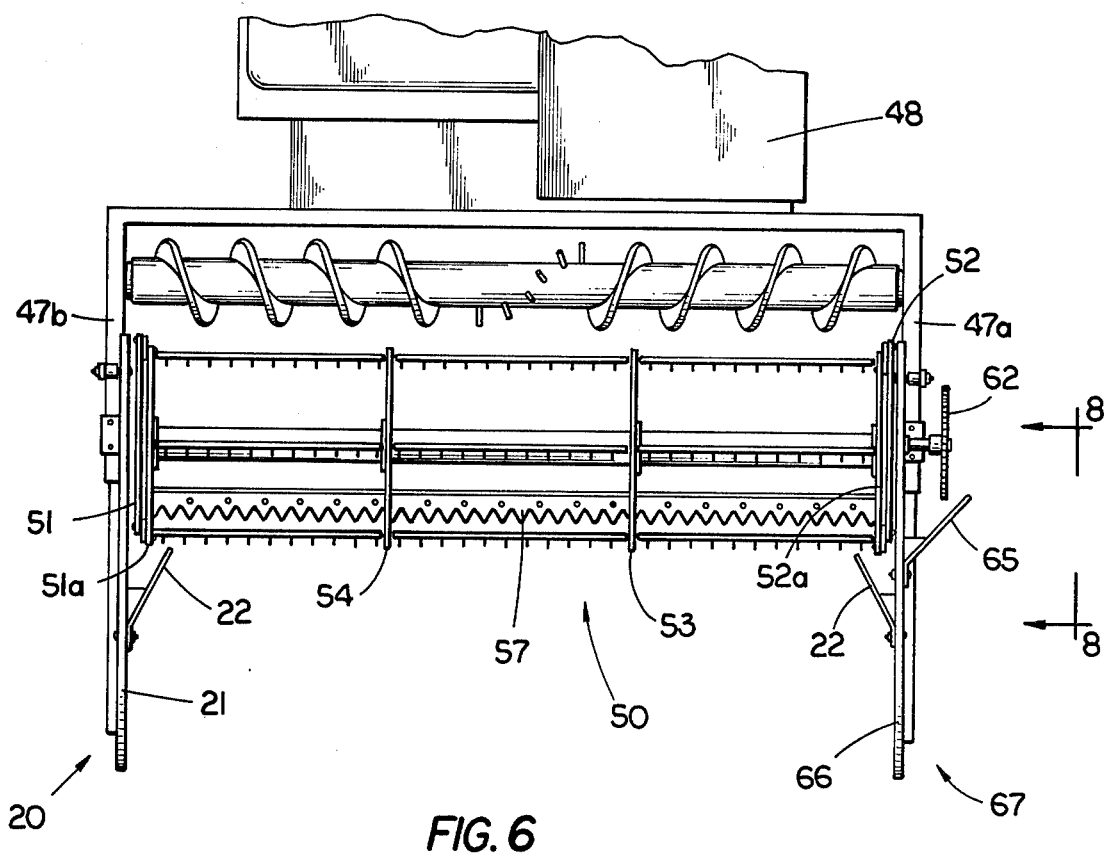
FIG. 6 is a top view of the FIG. 1 weed shield as attached to a combine.
Figure 7:
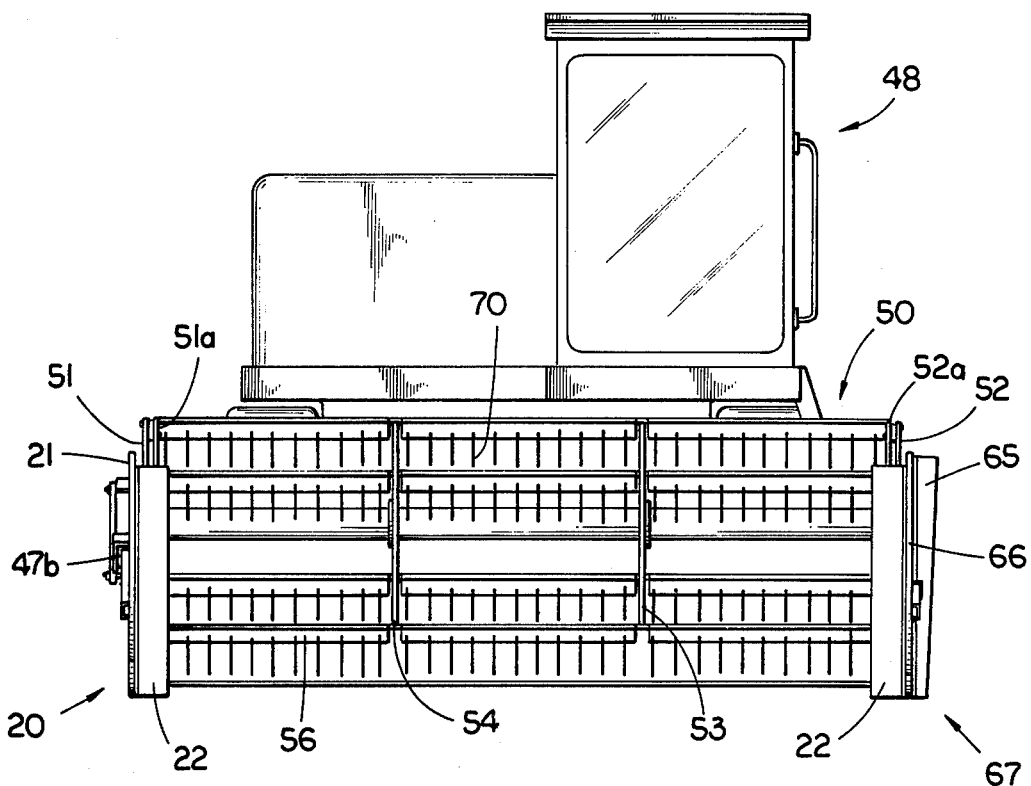
FIG. 7 is a front view of the FIG. 1 weed shield as attached to a combine.

Referring to FIGS. 5, 6 and 7, weed shields 20 and 67 are illustrated attached to combine arms 47b and 47a, respectively, and each shield is positioned between its corresponding arm and the corresponding hub portion at each end of reel 50. The following description will refer only to shield 20, but it is to be understood that a similar description applies to shield 67 and the same reference numerals will be used for identical parts.

Reel support arm 47b has a generally square, longitudinally extending cavity 68 extending from end 69 through arm 47b for at least three feet. Support bar 23 is suitably sized so as to fit snugly within cavity 68 yet remain slidable therewith. Consequently, shield 20 may be slid into proper position automatically by inserting bar 23 into cavity 68 and pushing panel 21 toward combine 48. Once shield 20 is properly oriented relative to reel 50, bar 23 and arm 47b may be rigidly bolted together and clamping brace 24 may be tightened into position. Panel 21 should protrude forward of the forwardmost portion of reel 50 by approximately three and one-half feet in order to provide a sufficient leading edge for the dividing of weeds and plants. Panel 21 actually acts as the initial deflector by directing plants and weeds either inwardly into reel 50 or outwardly to beyond the ends of the reel. Those weeds and plants which happen to be included between panels 21 and 66 as the combine moves forward, and which are close to the inwardly facing surfaces of these two panels will strike deflector plates 22 and will be deflected inwardly due to the 45° angle of the plates thereby funneling those weeds and plants into reel 50. This inward deflection is sufficient to prevent those weeds and plants from reaching the hub portions on each end of reel 50 and thereby prevents entanglement. Important to the prevention of weed entanglement is the fact that the outer edge 32 of each of the two deflector plates is positioned quite closely to the forwardmost leading edge of reel 50 so that weeds and plants which are inwardly deflected by plates 22 are caught by the reel fingers 70 and not allowed to spring back and entangle around the axle of the hub portion after these weeds and plants pass by outer edges 32. Also important to the prevention of entanglement is the fact that panels 21 and 66 have sufficient height and length to cover a majority of the area of the ends of reel 50. This means that particularly tall weeds and plants growing in an inclined or bent position will not protrude into the hub portions of the reel from the sides as the combine passes. It is important that the two deflector plates 22 extend inwardly to a sufficient degree so as to completely cover the susceptible hub portion on each end of reel 50. A suitable distance between edge 32 and inwardly facing surface 28 is approximately one foot although slightly larger distances or slightly smaller distances may be acceptable depending upon the particular style of reel and combine and the crop being harvested. Also, it is possible to alter the depth of inward projection of these deflector plates by altering the included angle between the deflector plate and the panel.

Consequently, the use of shields of 20 and 67 on each end of a platform combine reel provides an effective and inexpensive method of preventing weed entanglement from around the axle and hub portion of the reel and from around the sprocket and chain drive arrangement. A significant advantage of shields 20 and 67 is that they can be quickly attached to existing combine and reel machinery without the necessity for modifications, rework or disassembly. The shield merely slides into position and is securely bolted and clamped in place. The components of shields 20 and 67 are preferably fabricated from metal such as iron or steel and although threaded fasteners have been referred to, joining together of the various parts could equally well be performed by welding or similar joining techniques. It is also possible to fabricate shields 20 and 67 from other materials such as durable synthetics or wood. However, it is felt that these secondary materials would not have the same durability under all operating conditions and environments as metal, and that metal would be the preferred choice. In the event wood or plastic is used for the shields, it is suggested that a metal strip be attached to the top and bottom convex arcuate surfaces so that these surfaces will not be subject to rapid wear and deterioration as they contact and deflect the various weeds and plants.

Although different models of combines and reels may have slightly different structures, the design of shields 20 and 67 is such as to allow almost universal adaptation. Notch 46 could be enlarged as necessary and bar 23 could be shortened or bent or provided with different mounting holes in order to adapt to machinery variations and different support arm designs. It is also possible to add additional brackets in order to adapt the shields to yet further combine and reel configurations. However, it is believed that such modifications to the structure disclosed herein will be unnecessary for the majority of combine and reel configurations.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A weed shield for use with a platform-style combine of the type having reel support arms for keeping weeds and other plants from wrapping around the hub portion of the reel, said weed shield comprising:

a substantially flat, upright panel member having a reel-facing surface;

a rigid bar member secured to said panel member and including a free end for attachment to a reel support arm; and said panel member extending horizontally and vertically so as to cover a majority of the end of said reel and extend forward of said reel.

2. The weed shield of claim 1 which further includes a first deflector plate attached to said reel-facing surface forward of said reel, said deflector plate being of a solid, continuous nature and extending inwardly a suitable distance so as to extend inwardly beyond the outer end of said reel when said rigid bar is attached to said reel support arm.

3. The weed shield of claim 2 wherein said first deflector plate vertically extends a distance substantially equal to the height of said panel member at the location of attachment of said deflector plate to said panel member.

4. The weed shield of claim 1 wherein said panel member has an edge periphery comprising:

a top edge portion;

a bottom edge portion protruding forward of said top edge portion;

a notched rear edge portion joining said top and bottom edge portions together;

a first convex arcuate portion; and a second convex arcuate portion, said first and second arcuate portions joined to each other and joining said top and bottom edge portions together.

5. The weed shield of claim 4 wherein the notched area of said rear edge portion is suitably sized and positioned to provide clearance around the point of attachment of said reel support arm to one end of said reel.

6. The weed shield of claim 2 wherein said panel member further includes an outwardly facing surface opposite said reel-facing surface and said weed shield further includes a second deflector plate attached to said outwardly facing surface.

7. The weed shield of claim 6 wherein said second deflector plate vertically extends above and below the axis of rotation of said reel.

8. The weed shield of claim 5 wherein said panel member further includes an outwardly facing surface opposite said reel-facing surface and said weed shield further includes a second deflector plate attached to said outwardly facing surface.

9. The weed shield of claim 8 wherein said second deflector plate vertically extends above and below the axis of rotation of said reel.

10. In combination:

a platform-style combine;

two oppositely disposed combine reel support arms joined to said combine and extending forwardly thereof;

a platform reel attached at opposite ends to said combine reel support arms; and first and second weed shield members disposed on opposite ends of said reel, each weed shield member comprising:

(a) a substantially flat, upright panel member having a reel-facing surface;

(b) a rigid bar member secured to said panel member and including a free end for attachment to a reel support arm; and (c) each of said panel members extending horizontally and vertically so as to cover a majority of the corresponding end of said reel and extend forward of said reel.

11. The combination of claim 10 wherein each of said weed shield members further includes a first deflector plate attached to said reel-facing surface forward of said reel, said deflector plate being of a solid, continuous nature and extending inwardly a sufficient distance to extend inwardly beyond the outer end of said reel when said rigid bar is attached to said reel support arm.

12. The combination of claim 11 wherein each of said first deflector plates vertically extends a distance substantially equal to the height of its corresponding panel member at the location of attachment of said deflector plate to said panel member.

13. The combination of claim 12 wherein said platform reel includes a drive power end and said second weed shield member is located adjacent said drive power end, said second weed shield member further including an outwardly projecting second deflector plate.

14. The combination of claim 13 wherein said combine includes drive means coupled to said drive power end of said reel, said second deflector plate projecting outwardly a suitable distance so as to shield said drive means.

15. The combination of claim 14 wherein each panel member has an edge periphery comprising:

a top edge portion;

a bottom edge portion protruding forward of said top edge portion;

a notched rear edge portion joining said top and bottom edge portions together;

a first convex arcuate portion; and a second convex arcuate portion, said first and second arcuate portions joined to each other and joining said top and bottom edge portions together.

16. The combination of claim 15 wherein the notched area of said rear edge portion is suitably sized and positioned to provide clearance for the attachment of said combine to the corresponding end of said reel.

17. A weed shield for use with a platform-style combine of the type having reel support arms for keeping weeds and other plants from wrapping around the hub portion of the reel, said weed shield comprising:

a substantially flat panel member having a reel-facing surface and an exterior-facing surface and a substantially uniform thickness throughout, said panel member extending horizontally and vertically so as to cover a majority of the end of said reel;

a rigid bar secured to said exterior-facing surface and disposed in an upwardly inclined orientation as said rigid bar extends rearwardly from the front of said panel member; and a deflector plate attached to said reel-facing surface and inwardly extending therefrom at an acute included angle therewith, said deflector plate having a suitable size and positional relationship to said panel member whereby the innermost edge of said deflector plate is disposed at a location interior to the outer ends of said reel and nearly coincident with the leading edge of said reel.

18. The weed shield of claim 17 wherein said deflector plate is of a continuous nature throughout its entire length and said deflector plate extends in a vertical direction virtually the full height of said panel member at the location of the attachment of said deflector plate to said panel member.

19. The weed shield of claim 18 which further includes a second deflector plate attached to said exterior-facing surface and postioned between the point of attachment of said first deflector plate and the axle of said reel.

20. The weed shield of claim 18 wherein said rigid bar includes a free, rearwardly extending end suitably sized for attachment to a reel support arm.

21. The weed shield of claim 20 wherein said reel support arm has a hollow interior and said rigid bar is slidably received by the interior of said reel support arm and is bolted thereto.

22. The weed shield of claim 20 wherein the attachment of said rigid bar to said reel support arm is the sole connection of said weed shield to said combine.

* * * * *